… … … … … … … … … … … … … … … … … … … … … … … … … … … … … … US005951255A

United States Patent [19]
Krenkel et al.

[11] Patent Number: 5,951,255
[45] Date of Patent: Sep. 14, 1999

[54] DEVICE FOR FORWARDING A MEDIUM

[75] Inventors: Walter Krenkel, Renningen; Richard Kochendoerfer, Stuttgart, both of Germany

[73] Assignee: Deutsches Zentrum fur Luft-und Raumfahrt EV, Bonn, Germany

[21] Appl. No.: 09/035,389

[22] Filed: Mar. 5, 1998

[30] Foreign Application Priority Data

Mar. 5, 1997 [DE] Germany .......................... 197 08 825

[51] Int. Cl.$^6$ .................................................. F04D 29/02
[52] U.S. Cl. .................. 416/230; 416/241 A; 416/241 B
[58] Field of Search ......................... 416/230, 241 R, 416/241 A, 241 B, 186 R, 195, 213 R

[56] References Cited

U.S. PATENT DOCUMENTS

| 2,902,941 | 9/1959 | Kiba ..................................... 416/186 R |
| 3,501,090 | 3/1970 | Stoffer et al. ........................ 416/230 X |
| 4,052,133 | 10/1977 | Yeater .............................. 416/241 B X |
| 4,572,848 | 2/1986 | Pollak et al. ............................. 427/294 |
| 4,634,344 | 1/1987 | Zagar et al. ..................... 416/186 R X |
| 4,692,099 | 9/1987 | Homma et al. ...................... 416/230 X |
| 4,751,123 | 6/1988 | Broquere et al. ................... 416/230 X |
| 4,966,527 | 10/1990 | Merz .................................. 416/241 R |
| 5,222,866 | 6/1993 | LaBrouche et al. ..................... 416/230 |
| 5,292,231 | 3/1994 | Lauzeille .............................. 416/230 X |
| 5,314,309 | 5/1994 | Blakeley et al. ..................... 416/230 X |
| 5,316,851 | 5/1994 | Brun et al. ............................... 428/379 |
| 5,403,153 | 4/1995 | Goetze ................................ 416/230 X |
| 5,407,740 | 4/1995 | Jessen ..................................... 428/294 |
| 5,538,395 | 7/1996 | Hager .............................. 416/186 R X |
| 5,775,878 | 7/1998 | Maumus et al. .................... 416/186 R |
| 5,810,556 | 9/1998 | Northam et al. ....................... 415/200 |

FOREIGN PATENT DOCUMENTS

| 0399144 | 11/1990 | European Pat. Off. . |
| 1935013 | 1/1971 | Germany . |
| 2602136 | 9/1976 | Germany . |
| 2535196 | 2/1977 | Germany . |
| 3637464 | 5/1988 | Germany . |
| 3638244 | 5/1988 | Germany . |
| 3830443 | 3/1990 | Germany . |
| 4139293 | 6/1993 | Germany . |

*Primary Examiner*—John Ryznic
*Attorney, Agent, or Firm*—Milde, Hoffberg & Macklin, LLP

[57] ABSTRACT

A device is disclosed for forwarding a medium in the form of a gas, liquid, or loose particles. The medium can contain additives and/or contaminants in an aggregate state other than that of the medium itself. The device's major components are form-fit and force-fit together and comprise at least one supporting component along with blade-like components fastened to it. The supporting component is, or the supporting components are, made of a fiber-filled composite. The device is in particular an impeller for a pump, turbine, or similar mechanism. It is characterized in that the supporting component is, or the supporting components are, made of a lattice of essentially continuous fibers of carbon and/or ceramic and of a matrix that contains carbon and in that the fibers are sheathed with silicon carbide resulting from the infiltration of liquid silicon and from its reaction essentially with the carbon in the matrix.

25 Claims, 3 Drawing Sheets

DEVICE FOR FORWARDING A MEDIUM

BACKGROUND OF THE INVENTION

The present invention concerns a device for forwarding a medium in the form of a gas, liquid, or loose particles. The medium can contain additives and/or contaminants in an aggregate state other than that of the medium itself. The device's major components are form-fit and force-fit together and comprise at least one supporting component along with blade-like components fastened to it. The supporting component is, or the supporting components are, made of a fiber-filled composite. The device is in particular an impeller for a pump, turbine, or similar mechanism.

A device of this type for forwarding a gaseous or liquid medium and in the form of a radial wheel is known from the German Patent No. 4,139,293 C2. The wheel is made out of separate segments held together by disks at the bottom and/or top.

A device for forwarding oxygen is known from the German Patent No. 3,638,244 A1. It is a pump or compressor and is made of ceramic or of such a material as aluminum titanate, aluminum oxide, zirconium oxide, silicon carbide, or silicon nitride coated with ceramic. The shaft of the pump is also coated with ceramic, and the pump housing and impeller are entirely ceramic.

A heat-resistant blower impeller of carbon-reinforced graphite is known from the European Patent No. 0,399,144 A1.

A pump with two disk-shaped side walls that accommodate radial blades is disclosed in the German Patent 2,602,136 A1. The individual components are mainly to be made of metal and welded together. Such non-metallic materials as plastic are also mentioned however, with the parts fastened together with plastic instead of by welding.

The German Patent Publication (OS) No. 1,935,013 describes an impeller for axial blowers made of plastic (polypropylene, polyamide, or a copolymer). Its blades and side wall are separately fabricated and permanently fastened together with interlocking and welded joints.

The German Patent Publication (OS) No. 2,535,196 concerns an impeller for radial-flow machines, The components are injection-molded of plastic or light metal and attached together with clamps.

A hot-gas blower with a metal shaft and hub is described in the German Patent No. 3,830,443 A1. Its blades are of refractory ceramic materials, silicon carbide for example.

Finally, the German Patent No. 3,637,464 discloses a radial hot-gas blower. Its bottom and top are of refractory metal superalloys with blades of refractory ceramics interposed form-fit between them.

As will be evident from the aforesaid state of the art, various materials are employed to manufacture pump and turbine impellers, depending on the medium being forwarded etc. Another factor is the weight of the impeller, and plastic parts are always employed when the mechanism has to be light.

SUMMARY OF THE INVENTION

The principal object of the present invention is to provide an improved device of the aforesaid type for forwarding a medium in the form of a gas, liquid, or loose particles that will be light in weight and appropriate for a wide range of applications and especially for forwarding chemically aggressive media at a wide range of temperatures.

This object, as well as further objects and advantages which will become apparent from the discussion that follows, are achieved, in accordance with the present invention, in a device of the aforesaid type in that the supporting component is, or the supporting components are, made of a lattice of essentially continuous fibers of carbon, or so-called "long fibers" which can be directed or structured in respect to their axes, and/or a ceramic and of a matrix that contains carbon. The fibers are sheathed with silicon carbide resulting from the infiltration of liquid silicon and from its reaction essentially with the carbon in the matrix. The fibers are thus embedded in and surrounded by the matrix which is preferably formed of at least one polymer with a high carbon content (over 50% by weight).

The main feature of the device in accordance with the present invention is the supporting component, which is designed especially for forwarding a medium in the form of a gas, liquid, or loose particles and possibly containing additives and/or contaminants in an aggregate state other than that of the medium itself. Such a supporting component can be complemented with appropriately designed blade-like components, which can be fabricated of other materials. The supporting component is also characterized by light weight and high stability. The advantage is a low angular momentum.

The device in accordance with the present invention is also appropriate for forwarding and compressing oxygen at low temperatures. Chemically aggressive media, flue gas for instance, can also be conveyed at rates measurable in fluid-mass counters. The device in accordance with the present invention can also be employed for high-temperature applications as well, in gas turbines and hot-gas pumps for example, especially at high speeds. It has also been demonstrated that devices in accordance with the present invention can forward such mineral-conveying media as sandy water, from glacier streams for instance, with no observable friction from erosion or abrasion.

The aforesaid supporting component can be provided with precisely dimensioned depressions in the form of grooves for instance or with elevations in the form of ridges for instance, and the depressions or elevations can be uniformly distributed radially and/or axially over the supporting component and act as accommodations for the blade-like components, which can be medium-forwarding or channeling blades or vanes for example.

To provide the supporting component with high stability it has been demonstrated to be of advantage, if the supporting component is in the form of a disk, for the fibers in its lattice to extend essentially along its major plane in the form for example of layers of fabric and, if the supporting component is an annular supporting component, for the fibers to be oriented along its circumference in the form for example of coils.

A supporting component of the aforesaid design can be very large, with a diameter of several meters, limited only by the size of the manufacturing machinery.

Embedding a lattice of carbon and ceramic fibers in a polymer matrix high in carbon allows the supporting component to be of any desired shape. Well-defined fissures can then be created in this blank by pyrolysis, to be infiltrated by the initially liquid silicon. The liquid silicon will then react with the carbon in the matrix's lattice into silicon carbide, resulting in a homogeneous, strong, and abrasion-resistant but light-weight structure of high dimensional stability and heat resistance. It has been demonstrated that the fibers in a supporting component of this kind will be sheathed in ceramicized silicon carbide, contributing to the supporting component's excellent properties.

The blade-like components in one preferred embodiment are fabricated like the supporting component, meaning from a lattice of essentially continuous fibers of carbon and/or ceramic. The silicon infiltrates in a vacuum and within a temperature range of 1450 to 1500° C. The conversion to silicon carbide subsequently occurs at a temperature of 1650° C. and over preferably 2 hours or as the temperature increases to 2000° C. It is these parameters in particular that lead to good results in terms of a low level of residual silicon. Resistance to heat and chemicals, especially caustics, is particularly satisfactory.

Blades separately fabricated and shaped to ensure ideal flow can be fastened to the supporting component permanently and rigidly enough to resist the high stresses occasioned for instance by any cavitation or abrasion that may occur when a device of this type is in operation. The blade-like components can preferably be permanently fastened to the supporting component by a layer of adhesive essentially consisting of silicon carbide. Tests have demonstrated that a layer of silicon carbide can create a highly rigid interface between such a supporting component, with a matrix made mainly of silicon carbide, and such blade-like components, which are made of ceramic.

Care must be taken to ensure that the fibers at the surface of the components and accordingly coming into contact with the medium extend along the same plane, essentially parallel or tangential to the direction the medium will flow in. The advantage of this approach is that the abrasion caused by the flowing medium will be decreased to a minimum. Even in the event of a certain amount of abrasion, the flow-promoting properties of the surface will be maintained and no turbulence will occur.

To ensure structural stability and a homogeneous distribution of the fibers, the components should be built up of layers of woven and/or knit fabric, preferably bidirectional woven fabric, each more or less isotropic to the one below it.

To increase the fracture strength of the fibers in the different components, the fibers can be provided with a sheath of carbon or boron nitride 50 to 500 nm thick. If the sheath is carbon, it should not be entirely exposed to reaction with the infiltrating liquid silicon.

The volume of fiber in the lattices of both the supporting component and the blade-like component should be between 30 and 70% and preferably more than 50% per unit of volume of the composite that the component is made of.

Fibers of either carbon and/or ceramic are basically appropriate for both the supporting component and the blade-like components. A lattice with a high proportion of carbon fibers, between 50 and 100%, however, is preferred.

The blade-like components can, as hereintofore described, be fabricated separate from the supporting component but of a similar material and subsequently fastened to it. Broken or worn blade-like components can accordingly be replaced by fastening them on with a similar procedure.

One advantage of fabricating the supporting component separate from the fiber-reinforced blade-like components is that the fibers in the supporting component and in the blade-like components can be oriented to best accommodate the forces that impinge on them when the device is in operation. Since the supporting component will be almost always subject to tension deriving from centrifugal force, the fibers in a supporting component in the form of a disk should be oriented along the plane of the disk and those in the blade-like components, which will be exposed to tension and flow-induced forces, should be oriented along the components' longitudinal axes and tangential to the flow in order to best accommodate those forces.

If the blade-like components are ceramic monoliths, the ceramic should not be made of oxides because the components will expand like the fiber-reinforced supporting component, and the expansion must be tolerated enough to preserve the joint. Non-oxide ceramics are also very resistant to corrosion and chemicals and are accordingly highly appropriate for pumps and turbines.

Sintered, pressed, or reaction-bonded silicon carbide or silicon nitride are preferred for such ceramic monoliths. The blade-like components can alternatively be fabricated from carbon, especially graphite, and inserted into the supporting component. Just as appropriate are blade-like components of carbon-fiber reinforced carbon. Since graphite blade-like components will expand like the supporting component, and since graphite is lower in specific weight than ceramic, blade-like components of graphite are also preferred for their light weight and lower moment of inertia, which will lead to less stress on the overall device. Blade-like components of graphite or carbon-fiber reinforced carbon are particularly appropriate for forwarding media from the freezing point up to approximately 400° C. in atmospheres that contain oxygen and even up to approximately 2000° C. in the absence of oxygen.

As will be evident from the foregoing, blade-like components of many different materials can be fastened to a supporting component of this design without sacrificing the aforesaid stability, resistance to corrosion, etc. The material that the blade-like components are made of should expand at least similarly to that of the supporting component in accordance with the present invention. Such a supporting component can be employed as a basic component almost universally.

The level of free silicon in the fabricated components, the supporting component and blade-like components, that is, should be less than 5% of their overall mass. If more silicon is employed, it would leach out, especially in a basic environment, to the detriment of the tightness, stability, strength, and life of the device as a whole, especially when it is rotating at high speed.

The finished device, the supporting component with the blade-like components in place, that is, can subsequently be provided with a coat, preferably of silicon carbide or mullite and preferably 20 to 200 ∃µ/m thick, to protect it against corrosion, abrasion, and/or oxidation. These materials will readily bond to both the supporting component and the blade-like components and will protect the overall device from corrosion and abrasion in most media. When such a coat is of silicon carbide, it should be applied by chemical-vapor deposition. This procedure ensures that every point of the complicated shape will be covered with a uniformly thick coat.

When large blade or turbine impellers are to be manufactured, it has been demonstrated to be practical to construct them of separate plates, fastened together with silicon carbide for instance. In this event, the fibers in the individual plates will parallel the major surface of each plate.

Flow-promoting blade-like components can be fabricated with their upstream ends thicker to provide lift. Such a shape can be created by positioning a core at the upstream end and wrapping it with several layers of fibers, carbon fibers for example, lying one on top of the other and extending toward the upstream end.

The aforesaid siliconization technique allows separate hubs in the form of hollow cylinders for example to be subsequently inserted into the supporting component. Such a hub can be fabricated as a component separate from the supporting component, the blade-like components, and possibly a side wall, all being subsequently fastened together into a total assembly, preferably with silicon carbide.

Devices in accordance with the present invention can also be employed to forward media at temperatures as high as 2000° C. The surfaces of such devices will also remain smoother, even when operated for long periods, than those of conventional media-forwarding devices, and flow will accordingly be more uniform.

For a full understanding of the present invention, reference should now be made to the following detailed description of the preferred embodiments of the invention as illustrated in the accompanying drawings.

DESCRIPTION OF THE PREFERRED EMBODIMENTS

Figure 1:
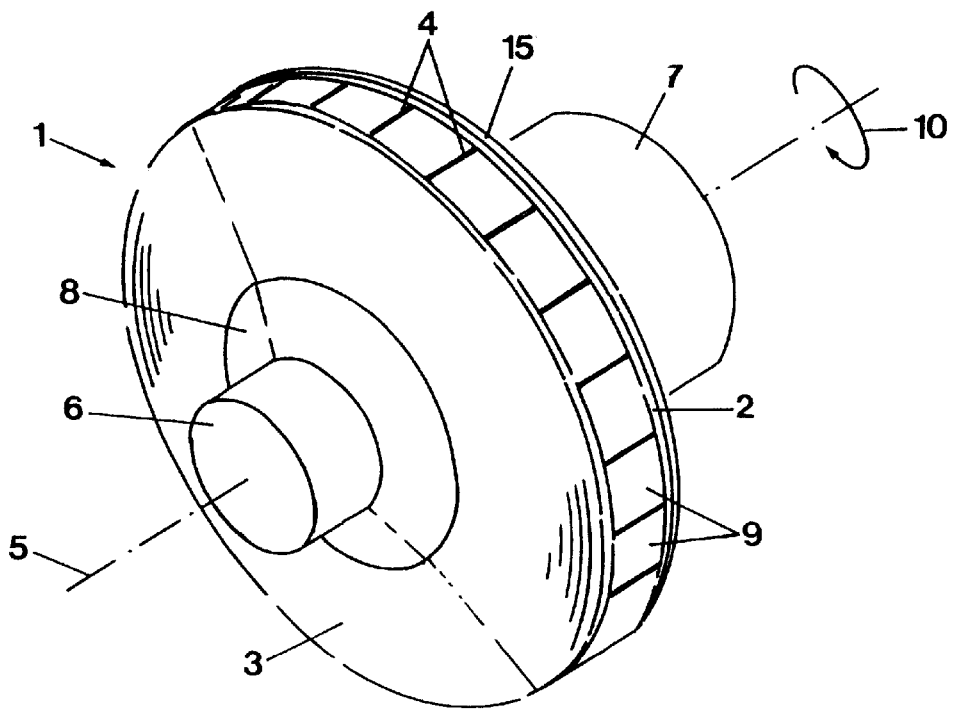
FIG. 1 is a schematic perspective view of a radial-pump or turbine impeller with a supporting component and side wall.

The preferred embodiments of the present invention will now be described with reference to FIGS. 1–5 of the drawings. Identical elements in the various figures are designated with the same reference numerals.

The impeller 1 for a pump or turbine illustrated in FIG. 1 has a flat and round supporting component 2 and a side wall 3. Side wall 3 can lie parallel to supporting component 2 or, in order to compress the medium if the impeller is employed in a compressor or allow the medium to expand if the impeller is employed in a turbine, at an angle to it. Distributed along the circumference and accommodated between supporting component 2 and side wall 3 are several blade-like components 4. Blade-like components 4 extend essentially radially outward from the impeller's axis 5 of rotation as indicated by the dot-and-dash line. Impeller 1 can be rotated either by a shaft 6 that extends into side wall 3 or by a shaft 7 that extends in the present example along axis 5 of rotation and into supporting component 2. The medium, air or a liquid for instance, being forwarded is drawn in through axial slots 8 and expelled through radial slots 9 between blade-like components 4. Impeller 1 rotates in the direction indicated by arrow 10.

Supporting component 2 was fabricated as a separate component from a lattice of continuous fibers of carbon and/or ceramic. The lattice is preferably composed of carbon fibers that extend in several layers essentially along the plane of the disk-shaped supporting component 2. The fibers were then embedded in a matrix of plastic containing a high proportion of carbon. Next, a well-defined microstructure was created by pyrolizing the polymeric material. Liquid silicon was then allowed to infiltrate the microstructure at a temperature of over 1420° C. and preferably within the range of 1450 to 1500° C. and to react with the carbon in the matrix to form silicon carbide. While the silicon carbide was forming, the temperature was either maintained at approximately 1650° C. for two hours or increased to 2000° C. and maintained there for approximately one hour. The latter alternative has the advantage of leaving less residual free silicon, which makes the material more resistant to caustics and other aggressive chemicals.

Figure 2:
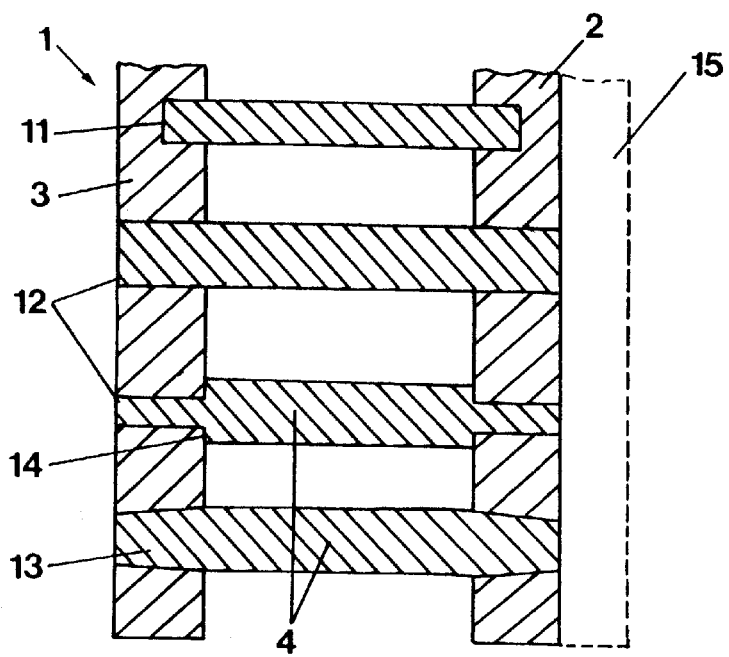
FIG. 2 is a section through a pump impeller or turbine impeller perpendicular to the supporting component and side wall illustrating various means of securing blade-like components into the supporting component and wall.

An already pyrolized but not yet silicon-infiltrated supporting component 2 can be fabricated within narrow dimensional tolerances. This level of precision applies in particular to any grooves 11 or perforations 12 intended to accommodate blade-like components 4 as illustrated in FIG. 2. To secure blade-like components 4 in supporting component 2 more effectively, grooves 11 or perforations 12 were either integrated into prescribed points of the lattice as the supporting component 2 was being fabricated or machined in subsequent to the pyrolysis. The blade-like components 4 were then inserted into grooves 11 or perforations 12 as the impeller was assembled. This procedure allows bores like the tapering bore 12 illustrated at the bottom of FIG. 2 to be produced, so that each end 13 of a blade-like component 4 can be forced in. It is on the other hand also possible to provide a blade-like component 4 with a shoulder 14 resting against the inner surface of supporting component 2 or side wall 3. Blade-like components 4 were cemented into grooves 11 or perforations 12 with a paste containing carbon and cured at approximately 200° C. The silicon was then allowed to infiltrate the support and the interfaces at temperature of 1450° to 1500° C., in a vacuum for example and subject to capillary forces, and to react into silicon carbide with the carbon in the matrix.

Supporting component 2 was then reinforced with a reinforcing disk 15, several of which can optionally be employed sandwiched together.

The thickness of supporting component 2 can be controlled by the number of layers of fiber in the lattice that composes it. It is alternatively possible to build supporting component 2 up out of several such disks. In this event, several supporting-component disks will be laminated to supporting component 2 prior to ceramicization with liquid silicon and all ceramicized at once.

Figure 3:
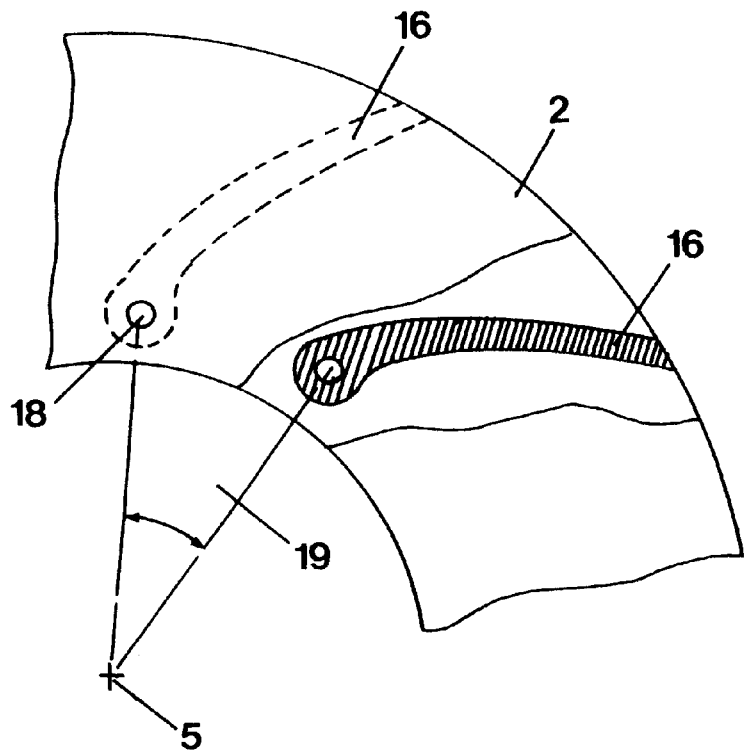
FIG. 3 is a section through one sector of an impeller perpendicular to its axis of rotation and showing two blade-like components.

The section through one sector of an annular supporting component 2 in FIG. 3 illustrates blade-like components 16 with a streamlined cross-section intended to provide lift. One such blade-like component 16 is illustrated at a larger scale in FIG. 4. There is a pivot 18 in the thicker end 17 of blade-like component 16 for securing the component in matching bores or possibly grooves.

Figure 4:
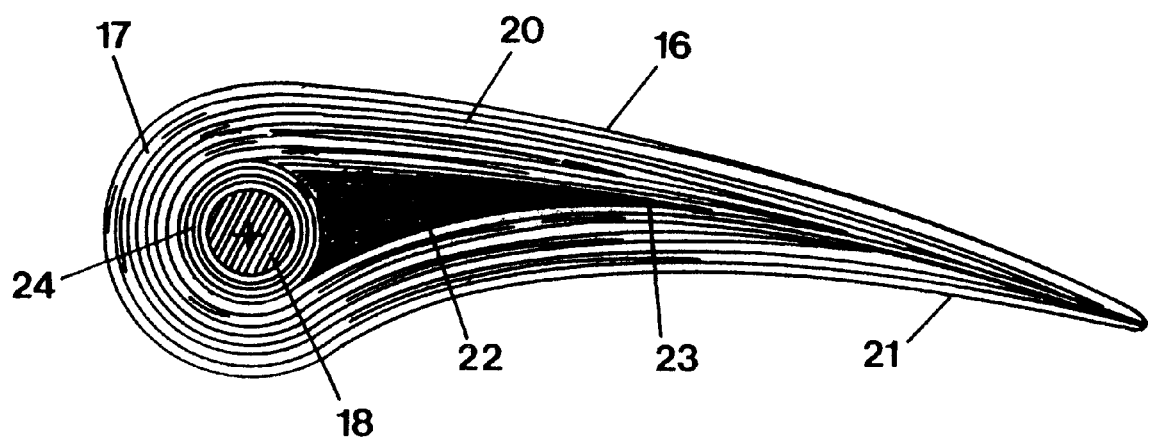
FIG. 4 is a larger-scale section through a streamlined blade-like component like one of those illustrated in FIG. 3 perpendicular to the direction of flow and showing the layered construction of the lattice of fibers.

As will be evident from FIG. 4, pivot 18 is surrounded by an annular reinforcement 24. Several layers 20 of fiber are wrapped around reinforcement 24 and meet at the downstream end 21 of blade-like component 16. Several layers of fiber are combined into a wedge 22 at the side of reinforcement 24 that faces downstream end 21. Wedge 22 occupies the area between reinforcement 24 and the point 23 where layers 20 of fiber first meet. How this particular blade-like component 16 is fabricated will now be specified. A well-defined microstructure is created around the lattice in a component essentially composed of continuous fibers, carbon fibers for instance, and coated with fibers as illustrated in FIG. 4, by initially sheathing the separate fibers for example with a pyrolizable layer, a polymer for example, and pyrolyzing it at appropriate temperatures. Polymers that sheathe a fiber lattice can be pyrolyzed in this way in a nitrogen atmosphere at approximately 900° C. Grooves or depressions and perforations can be machined out of the accordingly stabilized work subsequent to pyrolysis. The resulting microscopically fissured structure is then infiltrated by silicon, which reacts with the carbon in the matrix to form silicon carbide, resulting in a high-strength but not fragile silicon-carbide ceramic.

The advantage of blade-like components like those illustrated in FIG. 4 is a shape that offers less resistance as the impeller rotates. It will also be evident from FIG. 4 that even very complicated shapes can be produced with the present procedure with no loss of stability because the fiber orientation allows highly stressed areas to be specifically reinforced. This method of construction is possible in the raw state, meaning that fiber structures can be created first to match the paths of load, and then ceramicized by infiltration of the liquid silicon, which is then converted it along with the carbon into silicon carbide.

Figure 5:
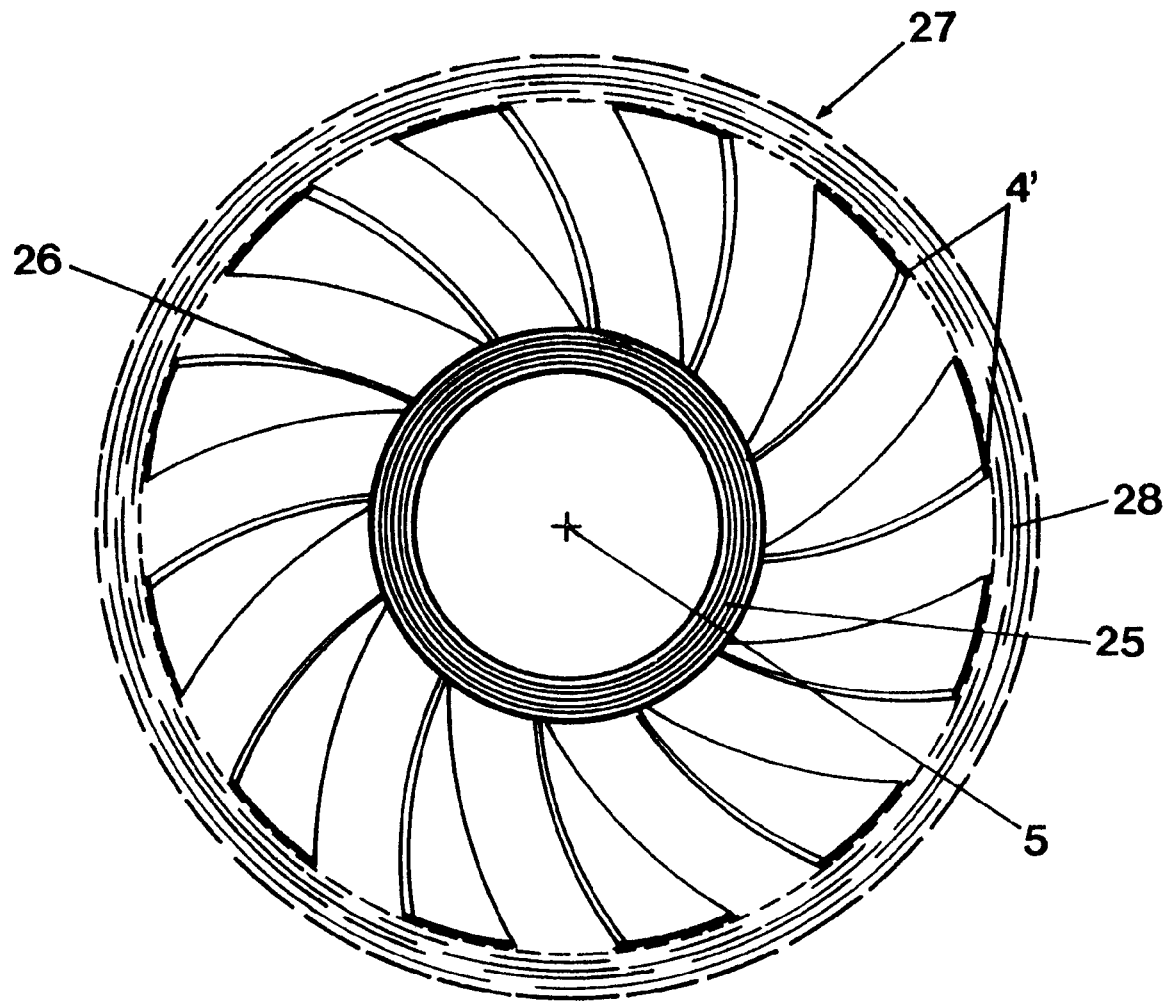
FIG. 5 is a schematic view of an axial impeller along its axis of rotation.

The axial impeller 27 schematically illustrated in the view along the axis 5 of rotation in FIG. 5 is similar in principle to the radial impeller 1 illustrated in FIG. 1. At the center of the assembly is an annular supporting component 25 composed of layers of fiber. Blade-like components 4' extend radially out of annular supporting component 25. These components are secured, doweled in as illustrated in FIG. 2 for example, in annular supporting component 25. If the joints between the blade-like components and the annular supporting component are to be subjected to powerful centrifugally derived forces, the supporting component 26 of each blade-like component can be protected by securing the outer end of each in an outer annular supporting component 28 with fibers that as indicated in FIG. 5 extend essentially along the circumference. For this purpose a structure like that of the axial impeller 27 illustrated in FIG. 5 can be fabricated with the blade-like components 4' secured between inner annular supporting component 25 and outer annular supporting component 28. A stationary, non-rotating that is, assembly of this kind can be employed to channel media without forwarding them.

There has thus been shown and described a novel device for forwarding a medium which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. In a device for forwarding a medium in the form of a gas, liquid, or loose particles, whereby the medium can contain additives and/or contaminants in an aggregate state other than that of the medium itself, the device's major components are form-fit and force-fit together and comprise at least one supporting component along with blade-like components fastened to it, and at least one supporting component is made of a fiber-filled composite, the improvement wherein at least one supporting component is made of a lattice of essentially continuous fibers formed of at least one of carbon and a ceramic and of a matrix that contains carbon; wherein the fibers are sheathed with silicon carbide resulting from the infiltration of liquid silicon and from its reaction essentially with the carbon in the matrix and wherein the fibers in areas of the surface of the components that come into contact with the medium being forwarded extend in a plane essentially parallel or tangential to the direction the medium flows in.

2. The device defined in claim 1, wherein the blade-like components are medium-forwarding or channeling blades or vanes uniformly distributed along the supporting component.

3. The device defined in claim 1, wherein, if the supporting component is in the form of a disk, the fibers in its lattice extend essentially along its plane in the form for example of layers of fabric and, if the supporting component is an annular supporting component, the fibers are oriented along its circumference.

4. The device defined in claim 1, wherein the blade-like components are made of a lattice of essentially continuous carbon fibers and/or ceramic and of a matrix that contains carbon and wherein the fibers are sheathed with silicon carbide resulting from the infiltration of liquid silicon and from its reaction essentially with the carbon in the matrix.

5. The device defined in claim 4, wherein the blade-like components are streamlined and have a core at the thicker, upstream end with several layers of fiber wrapped around it, tapering in toward and resting together at the downstream end.

6. The device defined in claim 1, wherein the fibers are woven and/or knit.

7. The device defined in claim 6, wherein, in order to increase strength and elasticity, the fibers are woven or knit bidirectionally, each more or less isotropic to the one below it.

8. The device defined in claim 1, wherein, in order to decrease fragility, the fibers are sheathed in carbon or boron nitride.

9. The device defined in claim 8, characterized in that the sheath is 50 to 500 nm thick.

10. The device defined in claim 1, wherein the lattice is between 30 and 70%, and preferably more than about 50%, carbon by volume of the composite.

11. The device defined in claim 1, wherein the lattice is between 50 and 100% carbon fibers.

12. The device defined in claim 1, wherein the blade-like components are monolithic ceramic.

13. The device as in claim 12, wherein the monolith is sintered, pressed, or reaction-bonded silicon carbide or silicon nitride.

14. The device defined in claim 1, wherein the blade-like components are carbon, especially graphite.

15. The device defined in claim 14, wherein the carbon is reinforced with carbon fibers.

16. The device defined in claim 1, wherein a supporting component contains less than 5% free silicon per total mass.

17. The device defined in claim 1, wherein the assembled components are coated to protect them from at least one of corrosion, abrasion, and oxidation.

18. The device defined in claim 17, wherein the protective coat is 20 to 200 $\mu$m thick.

19. The device defined in claim 17, wherein the protective coat is silicon carbide or mullite.

20. The device defined in claim 19, wherein the protective coat is chemical-vapor deposited silicon carbide.

21. The device defined in claim 1, wherein the silicon carbide is formed when liquid silicon infiltrates a prescribed system of pores in the fiber lattice and reacts with the carbon therein.

22. The device defined in claim 21, wherein the silicon infiltrates in a vacuum at temperatures above 1420° C., preferably at temperatures ranging from 1450 to 1500° C., and wherein the silicon carbide is formed by maintaining the temperature at approximately 1650° C. for approximately two hours or by increasing the temperature to approximately 2000° C. and maintaining it there for an accordingly abbreviated time of up to approximately one hour.

23. The device defined in claim 1, wherein the supporting component is composed of several laminated disks or rings two-dimensionally reinforced with fibers paralleling their major plane.

24. The device as in claim 1, wherein the supporting component and the blade-like components are permanently bonded together with a layer of essentially silicon carbide.

25. In a device for forwarding a medium in the form of a gas, liquid, or loose particles, whereby the medium can contain additives and/or contaminants in an aggregate state other than that of the medium itself, the device's major components are form-fit and force-fit together and comprise at least one supporting component along with blade-like components fastened to it, and at least one supporting component is made of a fiber-filled composite, the improvement wherein at least one supporting component is made of a lattice of essentially continuous fibers formed of at lease one of carbon and a ceramic and of a matrix that contains carbon; wherein the fibers are sheathed with silicon carbide resulting from the infiltration of liquid silicon and from its reaction essentially with the carbon in the matrix; wherein the silicon carbide is formed when liquid silicon infiltrates a prescribed system of pores in the fiber lattice and reacts with the carbon therein; and wherein the silicon infiltrates in a vacuum at temperatures above 1420° C., preferably at temperatures ranging from 1450 to 1500° C., and wherein the silicon carbide is formed by maintaining the temperature at approximately 1650° C. for approximately two hours or by increasing the temperature to approximately 2000° C. and maintaining it there for an accordingly abbreviated time of up to approximately one hour.

* * * * *